United States Patent
Tamai et al.

(10) Patent No.: US 7,823,471 B2
(45) Date of Patent: Nov. 2, 2010

(54) METHOD FOR HYBRID VEHICLE POWERTRAIN CONTROL

(75) Inventors: Goro Tamai, West Bloomfield, MI (US); William L. Aldrich, III, Davisburg, MI (US); Birendra P. Bhattarai, Novi, MI (US); Donald D. Crites, Washington, MI (US); Tony T. Hoang, Warren, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 862 days.

(21) Appl. No.: 11/429,857

(22) Filed: May 8, 2006

(65) Prior Publication Data

US 2006/0266567 A1   Nov. 30, 2006

Related U.S. Application Data

(60) Provisional application No. 60/685,814, filed on May 31, 2005.

(51) Int. Cl.
*B60K 1/00* (2006.01)

(52) U.S. Cl. .................. 74/89.4; 180/65.1; 180/65.265; 180/65.28; 180/65.285; 903/946

(58) Field of Classification Search ................ 180/65.1, 180/65.2, 65.3, 65.4, 65.265, 65.28, 65.285; 903/930, 941, 942, 947, 946; 477/5–7, 14–16
See application file for complete search history.

(56) References Cited

U.S. PATENT DOCUMENTS

| | | | | |
|---|---|---|---|---|
| 4,487,303 A | * | 12/1984 | Boueri et al. | 477/86 |
| 4,757,886 A | * | 7/1988 | Brown et al. | 192/3.3 |
| 5,325,029 A | * | 6/1994 | Janecke et al. | 318/561 |
| 5,469,948 A | * | 11/1995 | Organek et al. | 192/35 |
| 5,481,170 A | * | 1/1996 | Edelen et al. | 318/650 |
| 6,176,808 B1 | * | 1/2001 | Brown et al. | 477/5 |
| 6,307,277 B1 | * | 10/2001 | Tamai et al. | 290/40 C |
| 6,371,739 B1 | * | 4/2002 | Aiba | 417/410.5 |
| 6,574,535 B1 | * | 6/2003 | Morris et al. | 701/22 |
| 6,645,109 B2 | * | 11/2003 | Williams et al. | 475/204 |
| 2002/0093202 A1 | * | 7/2002 | Downs et al. | 290/40 R |
| 2002/0117338 A1 | * | 8/2002 | Itou | 180/54.1 |
| 2002/0137597 A1 | * | 9/2002 | Genise et al. | 477/107 |
| 2002/0179047 A1 | * | 12/2002 | Hoang et al. | 123/350 |
| 2005/0054482 A1 | * | 3/2005 | Doering et al. | 477/107 |
| 2005/0250618 A1 | * | 11/2005 | Colvin et al. | 477/174 |
| 2006/0266567 A1 | * | 11/2006 | Tamai et al. | 180/65.1 |

* cited by examiner

*Primary Examiner*—Khoi Tran
*Assistant Examiner*—Kyung J Kim
(74) *Attorney, Agent, or Firm*—Quinn Law Group, PLLC

(57) ABSTRACT

The method of the present invention provides a variety of vehicle performance characteristics depending on the mode of operation. A first routine is initiated to provide an optimal balance of powertrain responsiveness and fuel economy for any given combination of vehicle speed and deceleration rate. The first routine may, according to a preferred embodiment, include a plurality of routines that are each configured to provide an optimal balance of powertrain responsiveness and fuel economy within a predefined range of vehicle speeds and deceleration rates. A second routine is initiated if said deceleration rate is within a predefined range. The second routine includes running the electric motor/generator while the hybrid vehicle is being stopped in order to control the driveline lash and thereby minimize disturbances during a subsequent engine re-start.

8 Claims, 4 Drawing Sheets

METHOD FOR HYBRID VEHICLE POWERTRAIN CONTROL

CROSS-REFERENCE TO RELATED APPLICATIONS

This application claims the benefit of U.S. Provisional Application 60/685,814, filed May 31, 2005, which is hereby incorporated by reference in its entirety.

TECHNICAL FIELD

The present invention relates to a method for hybrid vehicle powertrain control.

BACKGROUND OF THE INVENTION

A hybrid electric vehicle may be powered alternatively or simultaneously by an internal combustion engine and an electric motor/generator to maximize fuel economy. To propel the vehicle from a stopped position, the motor/generator can draw electrical energy from a battery to turn the engine crankshaft. As vehicle speed increases, fuel and spark are delivered to initiate engine operation. At a certain vehicle speed range, the motor/generator may operate as a generator driven by the engine crankshaft to recharge the battery and to supply electrical power to auxiliary vehicle devices such as fans, radios, etc.

SUMMARY OF THE INVENTION

The method of the present invention is configured to provide a variety of vehicle performance characteristics depending on the mode of operation. For example, the present invention is configured to provide maximum powertrain responsiveness during an aggressive driving mode, conventional creep torque during low deceleration "parking lot mode", and an optimal balance of powertrain responsiveness and fuel economy during a conventional driving mode. The present invention is additionally adapted to restart the engine of a hybrid electric vehicle with minimal disturbance.

The method for controlling a hybrid vehicle powertrain includes monitoring vehicle speed and vehicle deceleration rate. A first routine is initiated to provide an optimal balance of powertrain responsiveness and fuel economy for any given combination of vehicle speed and deceleration rate. The first routine may, according to a preferred embodiment, include a plurality of routines that are each configured to provide an optimal balance of powertrain responsiveness and fuel economy within a predefined range of vehicle speeds and deceleration rates. A second routine is initiated if said deceleration rate is within a predefined range. The second routine includes controlling the electric motor/generator while the hybrid vehicle is being stopped in order to control driveline lash and thereby minimize disturbances during a subsequent engine re-start.

The first routine may include transferring fuel to the engine at a first predetermined time and releasing a torque converter clutch to interrupt the transfer of a torque spike from the engine to the transmission during a subsequent engine re-start.

The second routine may include running the electric motor/generator for a predetermined amount of time after the hybrid vehicle has reached a predetermined speed to control driveline lash and thereby minimize disturbances during a subsequent engine re-start.

The method for controlling a hybrid vehicle powertrain may also include shutting off the engine after the completion of the first routine or the second routine.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
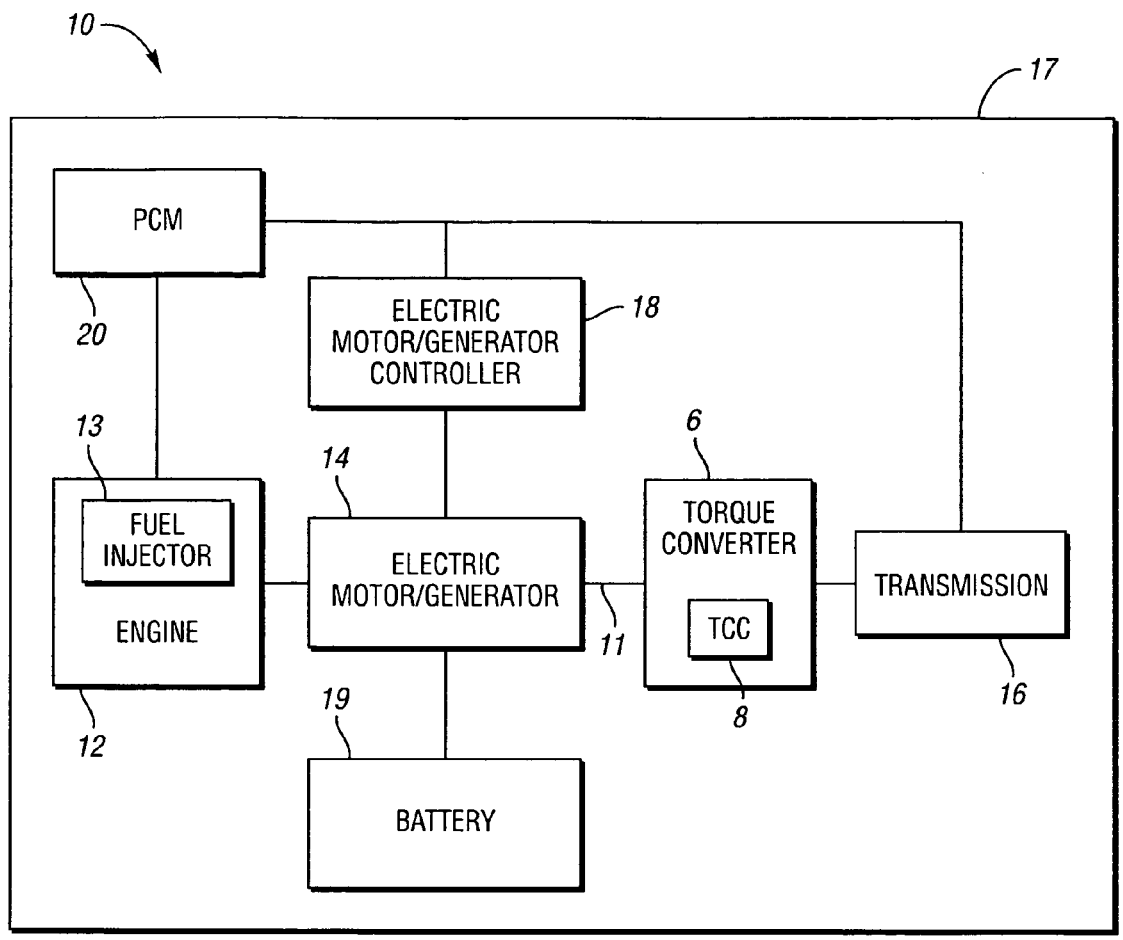
FIG. 1 is a schematic illustration of a hybrid vehicle powertrain in accordance with an aspect of the invention.

Referring to the drawings, wherein like reference numbers refer to like components, FIG. 1 shows a schematic representation of a hybrid electric vehicle 10. The hybrid electric vehicle 10 includes an internal combustion engine 12 having a plurality of fuel injectors 13, an electric motor/generator 14, and a multi-speed automatic transmission 16. The engine 12 and the motor/generator 14 are operatively connected to the transmission 16 via a driveline 11. The hybrid electric vehicle 10 may also optionally include a torque converter 6 having a torque converter clutch (TCC) 8, which is disposed between the engine 12 and the transmission 16. The TCC 8 is preferably hydraulically actuatable to lock-up the torque converter 6 such that energy is transferable therethrough with minimal loss (i.e., at approximately a 1:1 ratio). For purposes of the present invention, a vehicle powertrain 17 is defined as a combination of components including at least the engine 12, the electric motor/generator 14 and the transmission 16.

The electric motor/generator 14 of the hybrid vehicle 10 is controlled by an electric motor/generator controller 18. The electric motor/generator 14 is operatively connected to the engine 12 such that the motor/generator 14 selectively operates as a starter (by supplying a cranking torque to the engine 12), and as a generator (by receiving rotational energy from the engine 12 and converting it to electrical energy for recharging a battery 19).

The transmission 16 of the vehicle drive system is a well-known device that includes a plurality of gear sets and friction devices (not shown) operable to provide a number of drive speed ratios between the engine 12 and vehicle drive wheels (not shown). A powertrain control module (PCM) 20 controls the operation of the engine 12, transmission 16, and motor/generator controller 18. It should be appreciated that according to an alternate embodiment, the single PCM 20 shown may be replaced by alternate or additional control modules such as, for example, an engine control module and/or a transmission control module.

The method of the present invention is configured to provide a variety of different vehicle performance characteristics depending on the mode of operation. For example, the present invention is configured to provide maximum powertrain 17 responsiveness during an aggressive driving mode, conventional creep torque during low deceleration "parking lot mode", and an optimal balance of driveability and fuel economy during a conventional driving mode. For purposes of the present invention, "creep torque" is defined as a minimal amount of torque sufficient to drive the vehicle 10 slowly. "Powertrain responsiveness" is defined as the time required for the vehicle 10 to respond to an acceleration command.

For purposes of the present invention, four basic vehicle operation modes have been defined including: abrupt deceleration rate in a high vehicle speed band or range, abrupt deceleration rate in a low vehicle speed band or range, normal deceleration rate in the low vehicle speed band, and slow deceleration rate in the low vehicle speed band. "Normal deceleration" may be defined, for example, as that within the range of 1.5 and 20 mph/second. Accordingly, "abrupt deceleration" includes any deceleration rate above 20 mph/second, and similarly "slow deceleration" includes any deceleration rate below 1.5 mph/second. The "high vehicle speed band" is preferably defined between 20 and 25 mph, and the low vehicle speed band is between 14 and 19 mph. It should be appreciated that additional and/or alternate vehicle operation modes may be defined, and that the exemplary definitions for the deceleration rates and speed bands may vary according to alternate embodiments.

Figure 2:
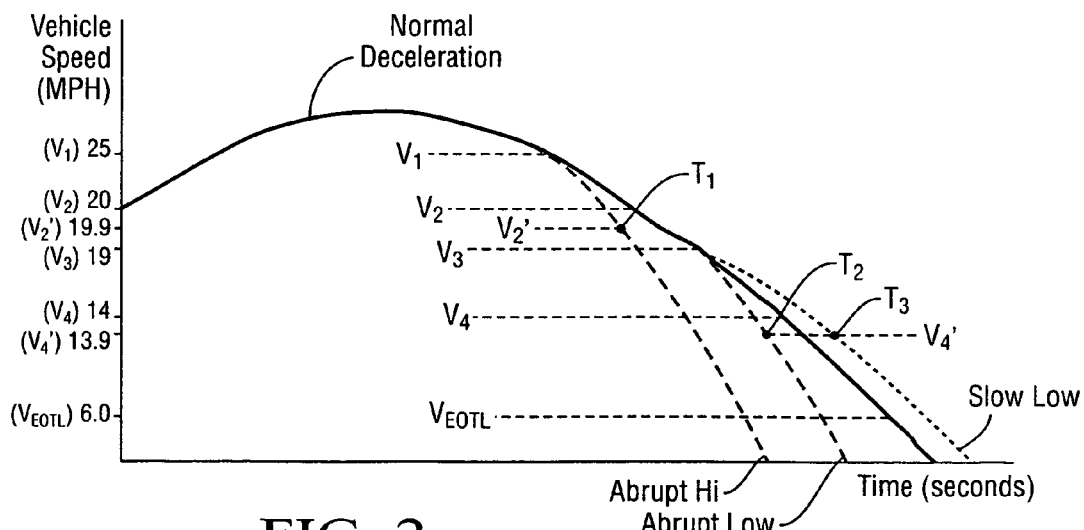
FIG. 2 is a graph of vehicle speed versus time showing a plurality of vehicle deceleration rates.

Referring to FIG. 2, a graph of vehicle speed (measured in miles per hour or mph) versus time (measured in seconds) is shown. Vehicle speed $V_1$ is 25 mph and vehicle speed $V_2$ is 20 mph such that the high vehicle speed band is defined therebetween. Vehicle speed $V_3$ is 19 mph and vehicle speed $V_4$ is 14 mph such that the low vehicle speed band is defined therebetween. Vehicle speed $V_2'$ is approximately 19.9 mph, and vehicle speed $V_4'$ is approximately 13.9 mph. Vehicle speed $V_{EOTL}$ is approximately 6.0 mph and represents the vehicle speed at which the engine off transition-lash (hereinafter EOTL) routine is executed as will be described in detail hereinafter.

The solid line labeled "normal deceleration" represents a normal deceleration rate. The dashed line labeled "abrupt hi" represents an abrupt deceleration initiated in the high speed band. The dashed line labeled "abrupt low" represents an abrupt deceleration initiated in the low speed band. The dotted line labeled "slow low" represents a slow deceleration initiated in the low speed band. Time $T_1$ represents the time at which the "abrupt hi" curve reaches vehicle speed $V_2'$, time $T_2$ represents the time at which the "abrupt lo" curve reaches vehicle speed $V_4'$, and time $T_3$ represents the time at which the "slow low" curve reaches the vehicle speed $V_4'$.

Figure 3:
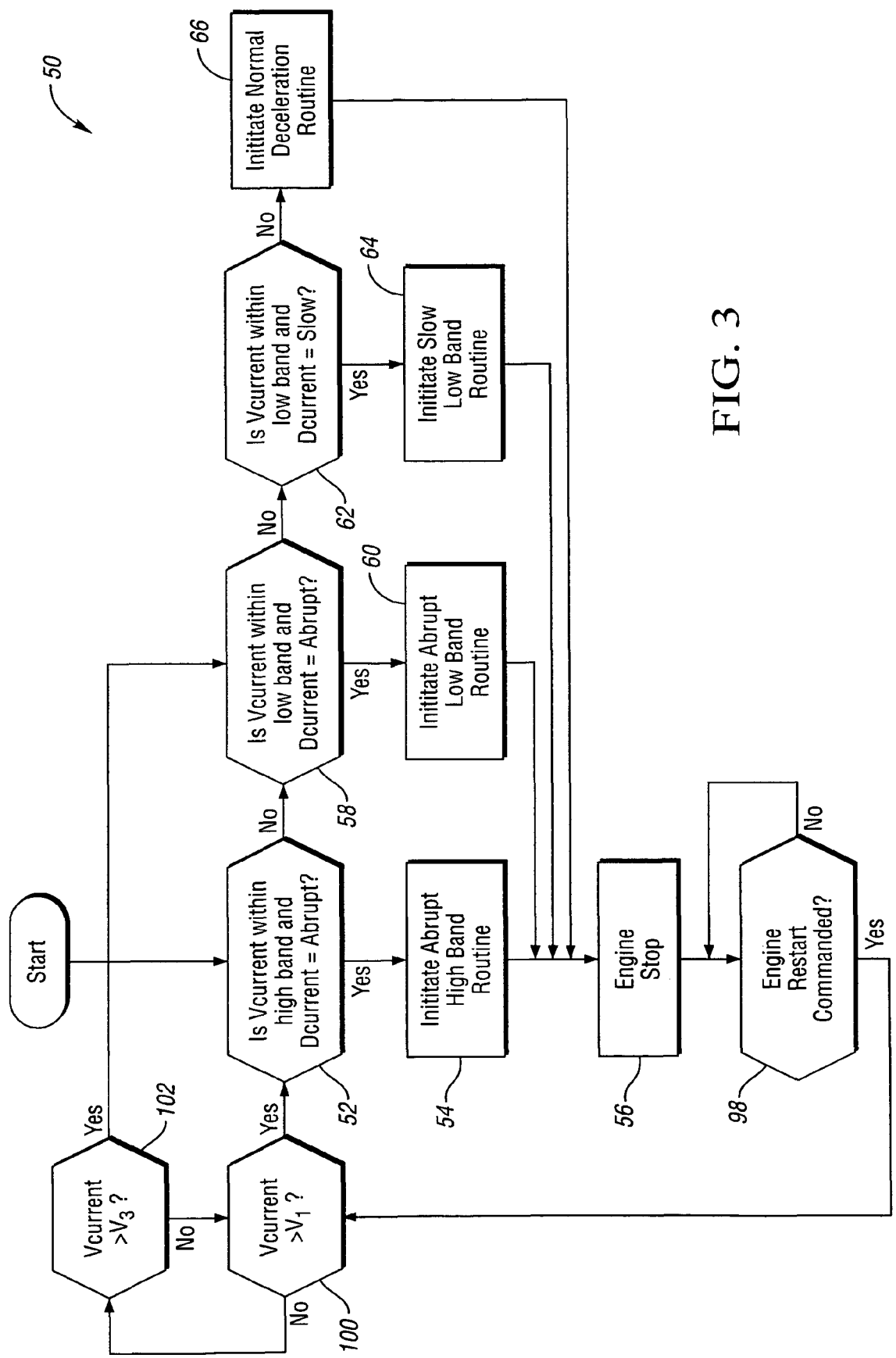
FIG. 3 is a block diagram illustrating a method of the present invention.

FIG. 3 depicts a method 50 of the present invention. More precisely, FIG. 3 shows a block diagram representing steps performed by the PCM 20 (shown in FIG. 1). It should be appreciated that the method 50 is preferably actuated only when the vehicle 10 is decelerating, the torque converter clutch or TCC 8 (shown in FIG. 1) is applied, and the fuel injectors 13 (shown in FIG. 1) of the engine 12 (shown in FIG. 1) are disabled.

As shown in FIG. 3, the method 50 for automatic downhill speed control (also referred to herein as algorithm 50) of the present invention is configured at step 52 to determine whether the current vehicle speed $V_{current}$ is within the high speed band defined between $V_1$ and $V_2$ (shown in FIG. 2), and whether the current rate of deceleration $D_{current}$ is "abrupt" as defined hereinabove. If, at step 52, the current vehicle speed $V_{current}$ is within the high speed band defined between $V_1$ and $V_2$, and the current rate of deceleration $D_{current}$ is "abrupt", the algorithm 50 proceeds to step 54. If, at step 52, the current vehicle speed $V_{current}$ is not within the high speed band defined between $V_1$ and $V_2$, or the current rate of deceleration $D_{current}$ is not "abrupt", the algorithm 50 proceeds to step 58. At step 54, the algorithm 50 initiates the "abrupt high band routine" as will be described in detail hereinafter. After the abrupt high band routine is initiated at step 54, the algorithm 50 proceeds to step 56 at which the engine 12 (shown in FIG. 1) is stopped.

According to a preferred embodiment of the present invention, at step 56 the PCM 20 is adapted cut off the transfer of fuel to the fuel injectors 13 (shown in FIG. 1) in order to stop the engine 12. It should be appreciated, however, that other conventional means for stopping the engine 12 may be implemented as well. Additionally, when the engine 12 is stopped at step 54, the electric motor/generator 14 (shown in FIG. 1) may be operated to control the deceleration rate and stop position of the crankshaft 11 (shown in FIG. 1) as described in commonly owned U.S. Pat. No. 6,453,864 which is hereby incorporated by reference in its entirety.

At step 58, the algorithm 50 is configured to determine whether the current vehicle speed $V_{current}$ is within the low speed band defined between $V_3$ and $V_4$ (shown in FIG. 2), and whether the current rate of deceleration $D_{current}$ is "abrupt" as defined hereinabove. If, at step 58, the current vehicle speed $V_{current}$ is within the low speed band defined between $V_3$ and $V_4$, and the current rate of deceleration $D_{current}$ is "abrupt", the algorithm 50 proceeds to step 60. If, at step 58, the current vehicle speed $V_{current}$ is not within the low speed band defined between $V_3$ and $V_4$, or the current rate of deceleration $D_{current}$ is not "abrupt", the algorithm 50 proceeds to step 62. At step 60, the algorithm 50 initiates the "abrupt low band routine" as will be described in detail hereinafter. After the abrupt low band routine is initiated at step 60, the algorithm 50 proceeds to step 56 at which the engine 12 (shown in FIG. 1) is stopped.

At step 62, the algorithm 50 is configured to determine whether the current vehicle speed $V_{current}$ is within the low speed band defined between $V_3$ and $V_4$ (shown in FIG. 2), and whether the current rate of deceleration $D_{current}$ is "slow" as defined hereinabove. If, at step 62, the current vehicle speed $V_{current}$ is within the low speed band defined between $V_3$ and $V_4$, and the current rate of deceleration $D_{current}$ is "slow", the algorithm 50 proceeds to step 64. If, at step 62, the current vehicle speed $V_{current}$ is not within the low speed band defined between $V_3$ and $V_4$, or the current rate of deceleration $D_{current}$ is not "slow", the algorithm 50 proceeds to step 66. At step 64, the algorithm 50 initiates the "slow low band routine" as will be described in detail hereinafter. After the slow low band routine is initiated at step 64, the algorithm 50 proceeds to step 56 at which the engine 12 (shown in FIG. 1) is stopped. At step 66, the algorithm 50 initiates the "normal deceleration routine" as will be described in detail hereinafter.

Figure 4:
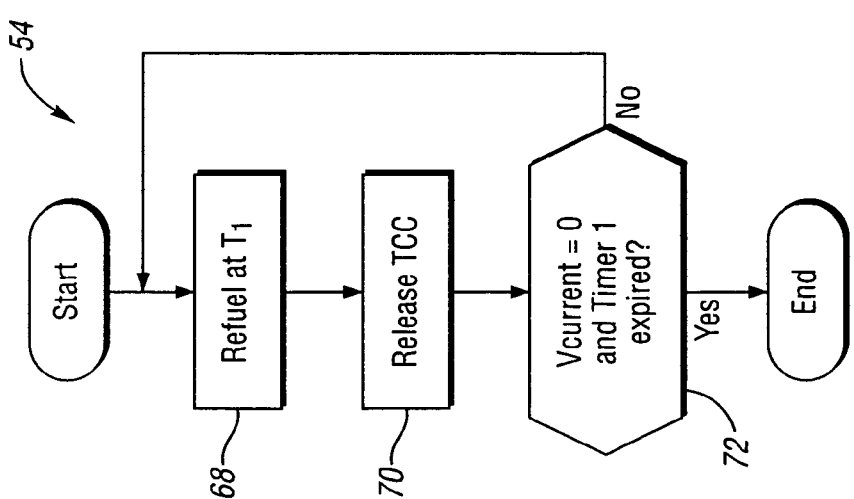
FIG. 4 is a block diagram illustrating a step of the method of FIG. 3.

Referring to FIG. 4, step 54 at which the algorithm 50 (shown in FIG. 3) initiates the "abrupt high band routine" is shown in more detail. At step 68, the algorithm 50 enables the fuel injectors 13 (shown in FIG. 1) of the engine 12 (shown in FIG. 1) at time $T_1$ (shown in FIG. 2). At step 70, the TCC 8 (shown in FIG. 1) is released. The TCC 8 is preferably released to provide a smoother engine restart by decoupling the engine 12 from the transmission 16 (shown in FIG. 1) to prevent the transfer of an engine torque spike therebetween. In other words, by releasing the TCC 8, any torque spike generated during the engine restart is not transferred to the transmission 16 and is therefore generally not observable or objectionable to any vehicle occupants. It should be appreciated that steps 68 and 70 may be performed simultaneously.

Alternatively, step 70 may be performed a predetermined amount of time before or after step 68 is initiated.

At step 72, the algorithm 50 determines whether the current vehicle speed $V_{current}$ is zero (i.e., the vehicle 10 is completely stopped), and a first timer (Timer1) has expired. Timer1 is preferably implemented to ensure that engine rotation is enabled for a predetermined amount of time (e.g., 0.9 seconds) after the vehicle 10 (shown in FIG. 1) comes to a stop to minimize driveline lash (as will be described in detail hereinafter), and to provide responsive driveability in case the operator chooses to accelerate. "Driveline lash" refers to play or clearance in the rotational position of the driveline 11 (shown in FIG. 1). Such clearance is generally necessary to accommodate variation and thermal expansion of powertrain components, however, it is well known that the amount of driveline lash tends to increase as the components wear. If $V_{current}$ is zero and Timer1 has expired, step 54 of the algorithm 50 is completed. If $V_{current}$ is not zero or Timer1 has not expired, the algorithm 50 returns to step 68.

Figure 5:
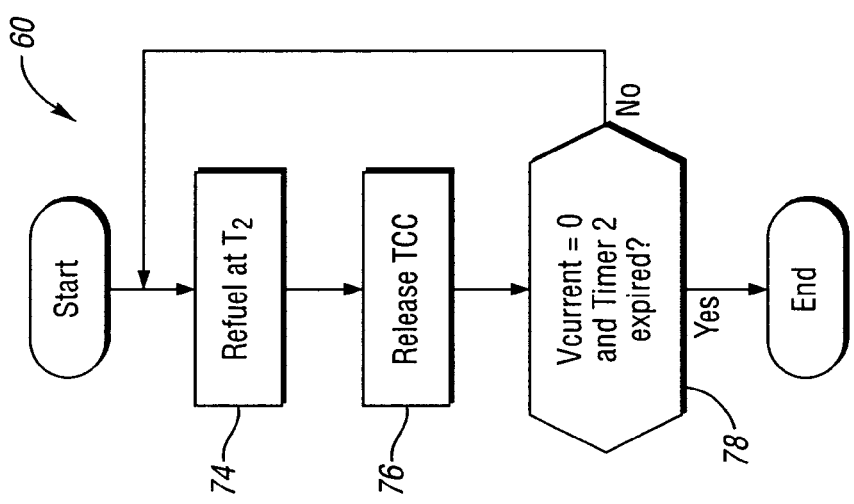
FIG. 5 is a block diagram illustrating a step of the method of FIG. 3.

Referring to FIG. 5, step 60 at which the algorithm 50 (shown in FIG. 3) initiates the "abrupt low band routine" is shown in more detail. At step 74, the algorithm 50 enables the fuel injectors 13 (shown in FIG. 1) of the engine 12 (shown in FIG. 1) at time $T_2$ (shown in FIG. 2). According to a preferred embodiment, the electric motor/generator 14 may be operated at step 74 before the fuel injectors are actuated to meet predefined mass air pressure (hereinafter MAP) requirements (e.g., maintain MAP below 45 kPa). At step 76, the TCC 8 (shown in FIG. 1) is released. The TCC 8 is preferably released to provide a smoother engine restart by decoupling the engine 12 from the transmission 16 (shown in FIG. 1) to prevent the transfer of an engine torque spike therebetween. In other words, by releasing the TCC 8, any torque spike generated during the engine restart is not transferred to the transmission 16 and is therefore generally not observable or objectionable to any vehicle occupants. It should be appreciated that steps 74 and 76 may be performed simultaneously. Alternatively, step 76 may be performed a predetermined amount of time before or after step 74 is initiated.

At step 78, the algorithm 50 determines whether the current vehicle speed $V_{current}$ is zero (i.e., the vehicle 10 is completely stopped), and a second timer (Timer2) has expired. Timer2 is preferably implemented to ensure that engine rotation is enabled for a predetermined amount of time (e.g., 0.6 seconds) after the vehicle 10 (shown in FIG. 1) comes to a stop to minimize driveline lash, and to provide responsive driveability in case the operator chooses to accelerate. If $V_{current}$ is zero and Timer2 has expired, step 60 of the algorithm 50 is completed. If $V_{current}$ is not zero or Timer2 has not expired, the algorithm 50 returns to step 74.

Figure 6:
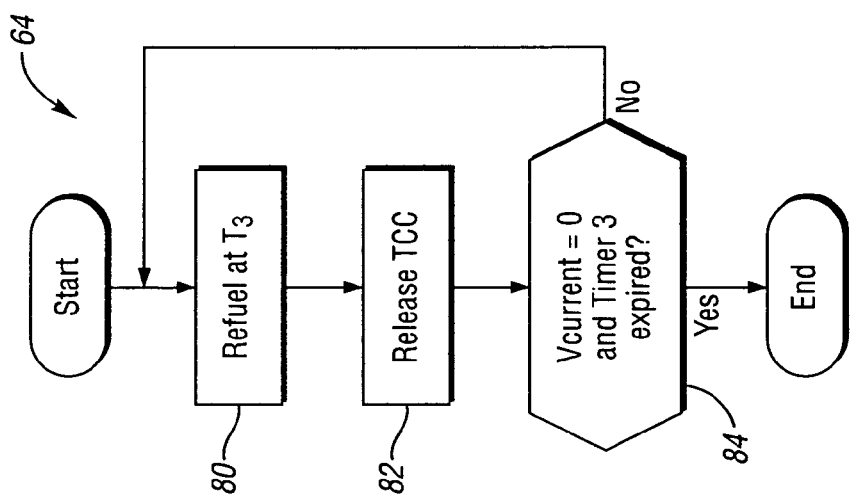
FIG. 6 is a block diagram illustrating a step of the method of FIG. 3.

Referring to FIG. 6, step 64 at which the algorithm 50 (shown in FIG. 3) initiates the "slow low band routine" is shown in more detail. At step 80, the algorithm 50 enables the fuel injectors 13 (shown in FIG. 1) of the engine 12 (shown in FIG. 1) at time $T_3$ (shown in FIG. 2). By turning on the fuel injectors 13, the engine 12 is kept running and is therefore capable of producing creep torque such that the vehicle 10 (shown in FIG. 1) maintains adequate drivability at low speeds. At step 82, the TCC 8 (shown in FIG. 1) is released. The TCC 8 is preferably released to provide a smoother engine restart by decoupling the engine 12 from the transmission 16 (shown in FIG. 1) to prevent the transfer of an engine torque spike therebetween. In other words, by releasing the TCC 8, any torque spike generated during the engine restart is not transferred to the transmission 16 and is therefore generally not observable or objectionable to any vehicle occupants. It should be appreciated that steps 80 and 82 may be performed simultaneously. According to a preferred embodiment, however, step 82 is performed after step 80 is initiated and when the vehicle 10 reaches approximately 10 mph.

At step 84, the algorithm 50 determines whether the current vehicle speed $V_{current}$ is zero (i.e., the vehicle 10 is completely stopped), and a third timer (Timer3) has expired. Timer3 is preferably implemented to ensure that engine rotation is enabled for a predetermined amount of time (e.g., 0.4 seconds) after the vehicle 10 comes to a stop to minimize driveline lash, and to provide responsive driveability in case the operator chooses to accelerate. If $V_{current}$ is zero and Timer3 has expired, step 64 of the algorithm 50 is completed. If $V_{current}$ is not zero or Timer3 has not expired, the algorithm 50 returns to step 80.

Figure 7:
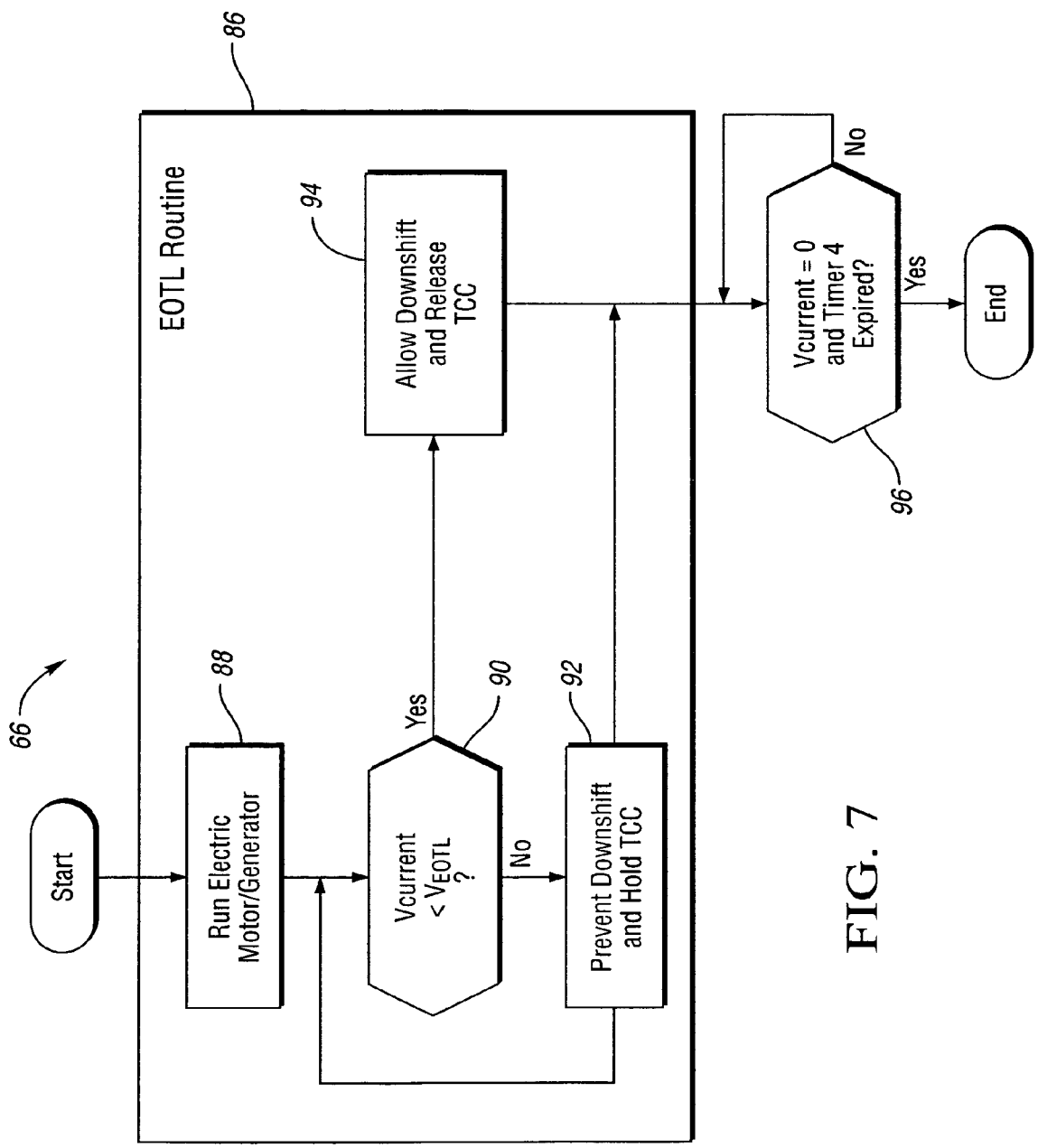
FIG. 7 is a block diagram illustrating a step of the method of FIG. 3.

Referring to FIG. 7, step 66 at which the algorithm 50 (shown in FIG. 3) initiates the "normal deceleration routine" is shown in more detail. At step 86, an EOTL routine is initiated. The EOTL routine of step 86 preferably includes steps 88-94 described in detail hereinafter. Step 86 is preferably initiated at time $T_4$ (shown in FIG. 2) at which the vehicle speed reaches approximately 6 mph during a "normal deceleration". As defined hereinabove, a "normal deceleration" is a deceleration within the range of 1.5 and 20 mph/second. At step 88, the electric motor/generator 14 (shown in FIG. 1) is implemented to spin the engine 12 (shown in FIG. 1) at a low speed such that the stopped position of the driveline 11 (shown in FIG. 1) is controllable electronically and in a fuel efficient manner (i.e., without using fuel to run the engine 12). In other words, the driveline 11 can be stopped at a predefined position in which it is pre-loaded in a forward direction to minimize the effects of driveline lash for the following restart.

At step 90, the algorithm 50 (shown in FIG. 3) determines whether the current vehicle speed $V_{current}$ is less than $V_{EOTL}$ (shown in FIG. 2) which, according to the preferred embodiment, is approximately 6 mph. If $V_{current}$ is not less than $V_{EOTL}$, the algorithm 50 proceeds to step 92. If $V_{current}$ is less than $V_{EOTL}$, the algorithm 50 proceeds to step 94. At step 92, the PCM 20 (shown in FIG. 1) prevents the transmission 16 (shown in FIG. 1) from downshifting and maintains engagement of the TCC 8 (shown in FIG. 1). At step 94, the PCM 20 allows the transmission 16 to downshift and the TCC 8 is released. At step 96, the algorithm 50 determines whether $V_{current}$ is less than or equal to a predetermined vehicle speed (e.g., zero in which case the vehicle 10 is completely stopped), and a fourth timer (Timer4) has expired. Timer4 is preferably implemented to ensure that engine rotation is enabled for a predetermined amount of time (e.g., 0.2 seconds) after the vehicle 10 (shown in FIG. 1) comes to a stop to minimize driveline lash, and to provide responsive driveability in case the operator chooses to accelerate. If $V_{current}$ is zero and Timer4 has expired, step 66 of the algorithm 50 is completed. If $V_{current}$ is not zero or Timer4 has not expired, the algorithm 50 repeats step 96.

Referring again to FIG. 3, it can be seen that after the engine is stopped at step 56, the algorithm 50 proceeds to step 98. At step 98, the algorithm 50 determines whether an engine restart has been commanded. If engine restart has not been commanded, step 98 is repeated. If engine restart has been commanded, the algorithm 50 proceeds to step 100. At step 100, the algorithm 50 determines whether the current vehicle speed $V_{current}$ is greater than $V_1$ (shown in FIG. 2) which, according to the preferred embodiment, is approximately 25 mph. If $V_{current}$ is greater than $V_1$, the algorithm 50 returns to step 52. If $V_{current}$ is not greater than $V_1$, the algorithm 50 proceeds to step 102. At step 102, the algorithm 50 determines whether the current vehicle speed $V_{current}$ is greater than $V_3$ (shown in FIG. 2) which, according to the preferred embodiment, is approximately 19 mph. If $V_{current}$ is greater than $V_3$, the algorithm 50 returns to step 58. If $V_{current}$ is not greater than $V_3$, the algorithm 50 returns to step 100.

While the best modes for carrying out the invention have been described in detail, those familiar with the art to which this invention relates will recognize various alternative designs and embodiments for practicing the invention within the scope of the appended claims.

Then invention claimed is:

1. A method for controlling a powertrain of a hybrid vehicle, said powertrain including an engine, a transmission, and an electric motor/generator, such that the engine and the electric motor/generator are operatively connected to the transmission via a driveline, said method comprising:
    monitoring vehicle speed;
    monitoring vehicle deceleration rate;
    initiating a first routine configured to provide an optimal balance of powertrain responsiveness and fuel economy for any given combination of vehicle speed and deceleration rate;
    initiating a second routine if said deceleration rate is within a predefined range, said second routine including pre-loading the driveline by running the electric motor/generator while the hybrid vehicle is in the process of being stopped for a predetermined amount of time after the hybrid vehicle has reached a predetermined speed to control driveline lash, and disturbances during a subsequent engine re-start are thereby minimized;
    providing a torque converter disposed between the engine and the transmission, said torque converter including a torque converter clutch that is actuatable to lock-up the torque converter such that energy is transferable therethrough with minimal loss; and
    wherein said initiating a first routine includes transferring fuel to the engine at a first predetermined time and releasing the torque converter clutch, thereby interrupting the transfer of a torque spike from the engine to the transmission during the subsequent engine re-start.

2. The method of claim 1, further comprising shutting off the engine after the completion of one of the first routine and the second routine.

3. The method of claim 2, wherein said shutting off the engine includes shutting off the transfer of fuel to the engine.

4. The method of claim 3, wherein said initiating a first routine includes initiating a plurality of routines each configured to provide an optimal balance of powertrain responsiveness and fuel economy within a predefined range of vehicle speeds and deceleration rates.

5. A method for controlling a powertrain of a hybrid vehicle, said powertrain including an engine, a transmission, and an electric motor/generator, such that the engine and the electric motor/generator are operatively connected to the transmission via a driveline, said method comprising:
    providing a torque converter disposed between the engine and the transmission, said torque converter including a torque converter clutch that is actuatable to lock-up the torque converter such that energy is transferable therethrough with minimal loss;
    monitoring vehicle speed;
    monitoring vehicle deceleration rate; and
    initiating a routine if said deceleration rate is within a predefined range, said routine including:
        determining whether the vehicle speed is below a predefined threshold speed;
        pre-loading the driveline by running the electric motor/generator in a manner configured to control driveline lash while the hybrid vehicle is in the process of being stopped, if the vehicle speed is below the predefined threshold speed, such that disturbances during a subsequent engine re-start are minimized; and
    wherein said initiating a routine includes releasing the torque converter clutch if the vehicle speed is below the predefined threshold speed.

6. The method of claim 5, wherein said running the electric motor/generator to control the driveline lash includes running the electric motor/generator until the rotational speed of the crankshaft reaches approximately zero.

7. The method of claim 5, wherein said running the electric motor/generator to control the driveline lash includes running the electric motor/generator for a predetermined amount of time after the speed of the hybrid vehicle reaches a predetermined speed.

8. The method of claim 5, further comprising shutting off the engine after the completion of the routine.

* * * * *